(12) United States Patent
Moreno et al.

(10) Patent No.: US 6,507,990 B1
(45) Date of Patent: Jan. 21, 2003

(54) METHOD OF MANUFACTURING A STATOR

(75) Inventors: Richard J. Moreno, Bartlesville, OK (US); Donald C. Watson, Claremore, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/540,684

(22) Filed: Mar. 31, 2000

(51) Int. Cl.$^7$ .......................... H02K 15/12; H02K 15/00
(52) U.S. Cl. .................. 29/596; 29/598; 29/732; 29/525; 310/42; 310/263
(58) Field of Search .................. 29/596, 598, 609, 29/732, 525, 402.04; 414/27, 791.2; 310/217, 42, 87, 263; 72/332, 348

(56) References Cited

U.S. PATENT DOCUMENTS

| | | | |
|---|---|---|---|
| 3,283,399 A | * | 11/1966 | Hart et al. |
| 4,007,867 A | * | 2/1977 | Wielt et al. ............... 228/179 |
| 4,079,512 A | * | 3/1978 | Lakes ........................ 29/732 |
| 4,202,196 A | * | 5/1980 | Asai et al. ................ 72/137 |
| 4,918,802 A | * | 4/1990 | Schaefer .................... 29/598 |
| 4,956,910 A | * | 9/1990 | Banner et al. ............. 29/593 |

FOREIGN PATENT DOCUMENTS

JP          57-6556     *  1/1982   .................. 29/596

* cited by examiner

*Primary Examiner*—Carl J. Abers
*Assistant Examiner*—Minh Trinh
(74) *Attorney, Agent, or Firm*—Fletcher, Yoder & Van Someren; Jeffrey E. Griffin, Esq.; Brigitte Jeffery, Esq.

(57) ABSTRACT

A system and method for manufacturing a stator is shown. An automated stator press is used to assemble a stator. The automated stator press includes a support frame, a control system, a sensor, and a hydraulic ram. Stator laminations are stacked onto a mandrel. The mandrel is placed in the support frame. A stator housing is placed over the mandrel. The hydraulic ram compresses the stator laminations in the stator housing. The control system receives compression information from the sensor, and operates the hydraulic ram based on stored process information and information received from the sensor. A stop is inserted in the stator housing to hold the stator laminations in a state of compression after removal of the hydraulic ram.

8 Claims, 9 Drawing Sheets

METHOD OF MANUFACTURING A STATOR

FIELD OF THE INVENTION

The present invention relates generally to electric motors, and particularly to a stator assembly that facilitates motor construction.

BACKGROUND OF THE INVENTION

Rotary electric motors are typically comprised of two primary components, a rotor and a stator. The stator is used to produce a rotating magnetic field. The rotating magnetic field induces a rotating force on the rotor that causes the rotor to rotate about an axis. The rotational motion of the rotor can be drivingly coupled to an external device, such as a pump.

The stator is typically constructed of conductors wound longitudinally around a core. These longitudinally wound conductors are spaced radially around the stator. The core typically is constructed from metallic laminations that have been stacked and pressed together. The laminations are manufactured with a pattern of openings so that when the laminations are stacked the individual openings form a pattern of continuous longitudinal openings extending through the lamination stack. Typically, the rotor is housed within a cavity formed by a center opening through the laminations. The conductors are wound through longitudinal conductor openings that are disposed around the central opening. The metallic laminations help to couple the magnetic field produced by the conductors to the rotor.

To operate the electric motor, the conductive wiring in the stator is coupled to an electrical power source. A magnetic field is produced from the electricity flowing through the conductive wiring. In an exemplary embodiment, the electrical power source provides three-phase alternating current. As the three phases of the alternating current cycle radially around the stator, the conductors produce a rotating magnetic field in the stator.

The required size of the stator and rotor depends on the amount of work needed from the motor. The strength of the motor is determined, primarily, from the strength of the magnetic field that can be produced by the stator. The strength of the magnetic field produced by the stator is, in turn, affected by the number of turns of the conductive wiring. All other factors being the same, the greater the number of turns the stronger the magnetic field produced.

A submersible electric motor for use in a submersible pumping system may be required to lift wellbore fluids from depths of several thousand feet. A conventional motor that could otherwise be used to provide the equivalent pumping power on the surface cannot be used in a wellbore, because the number of turns of conductive wiring needed to produce the required force would require a motor of such a large diameter that it would be too wide to fit into the wellbore. Therefore, instead of a relatively short, thick motor with a large number of turns, the stators of submersible electric motors are extremely elongated with a smaller number of turns. Elongating the stator allows the motor to produce the required force to drive a pump by developing the magnetic force over a much greater length.

Currently, electric motors, particularly elongate motors such as those used in submersible electrical pumping systems for pumping petroleum, are constructed with unitary stators. Depending on the horsepower required of the motor, electric submersible pumping system motors can utilize stator assemblies thirty feet long or more.

Traditionally, the stator assemblies have been constructed by stacking individual stator laminations together to form a stator of a desired length. The lamination stack is then inserted into the stator housing. The lamination stack is then compressed and maintained under compression within the stator housing. Maintaining the laminations under compression prevents the laminations from spinning freely inside the stator housing. However, constructing a stator in this manner can be problematic. The sheer size of the stator makes manipulating the stator components difficult. Furthermore, loading the stator laminations into the stator housing by hand is time consuming and difficult.

Therefore, it would be advantageous to have a method and system to facilitate assembly of the stator of an elongated, submersible electric motor of the type used with electric submersible pumping systems.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

According to one aspect of the present invention, a method is featured for manufacturing a stator for a submersible electric motor. The method includes placing stator laminations disposed over a mandrel into an automated stator press. The automated stator press has a hydraulic ram and an automatic control system. The method includes placing the stator laminations, while disposed over a mandrel, into a stator housing. The method also includes using the hydraulic ram to compress the stator laminations within the stator housing, and automatically controlling the compression of the stator laminations with the automatic control system. Further, a stop is placed into the stator housing to maintain the stator laminations in a state of compression after the force of the hydraulic ram is removed. The method also includes removing the force of the hydraulic ram and removing the mandrel from the stator housing.

According to another aspect of the invention, a method of manufacturing an electric motor is featured. The method includes placing stator laminations, disposed over a mandrel, into an automated stator press. The automated stator press has a hydraulic ram and an automatic control system to compress the stator laminations within a stator housing. The compression of the stator laminations is controlled with the automatic control system. The method further includes placing a stop into the stator housing to maintain the stator laminations in a state of compression after the force of the hydraulic ram is removed. Electrical conductors are routed through aligned openings in the plurality of laminations.

According to another aspect of the present invention, a system is featured for assembling stator laminations in a stator housing. The system includes an automated stator press to compress laminations in a stator housing. The stator press utilizes a mandrel upon which a plurality of stator laminations may be located. The system also includes a support frame to support the stator laminations when placed on the mandrel. A control system is designed to automatically operate a hydraulic ram positioned to compress the plurality of stator laminations to a desired length within the stator housing.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
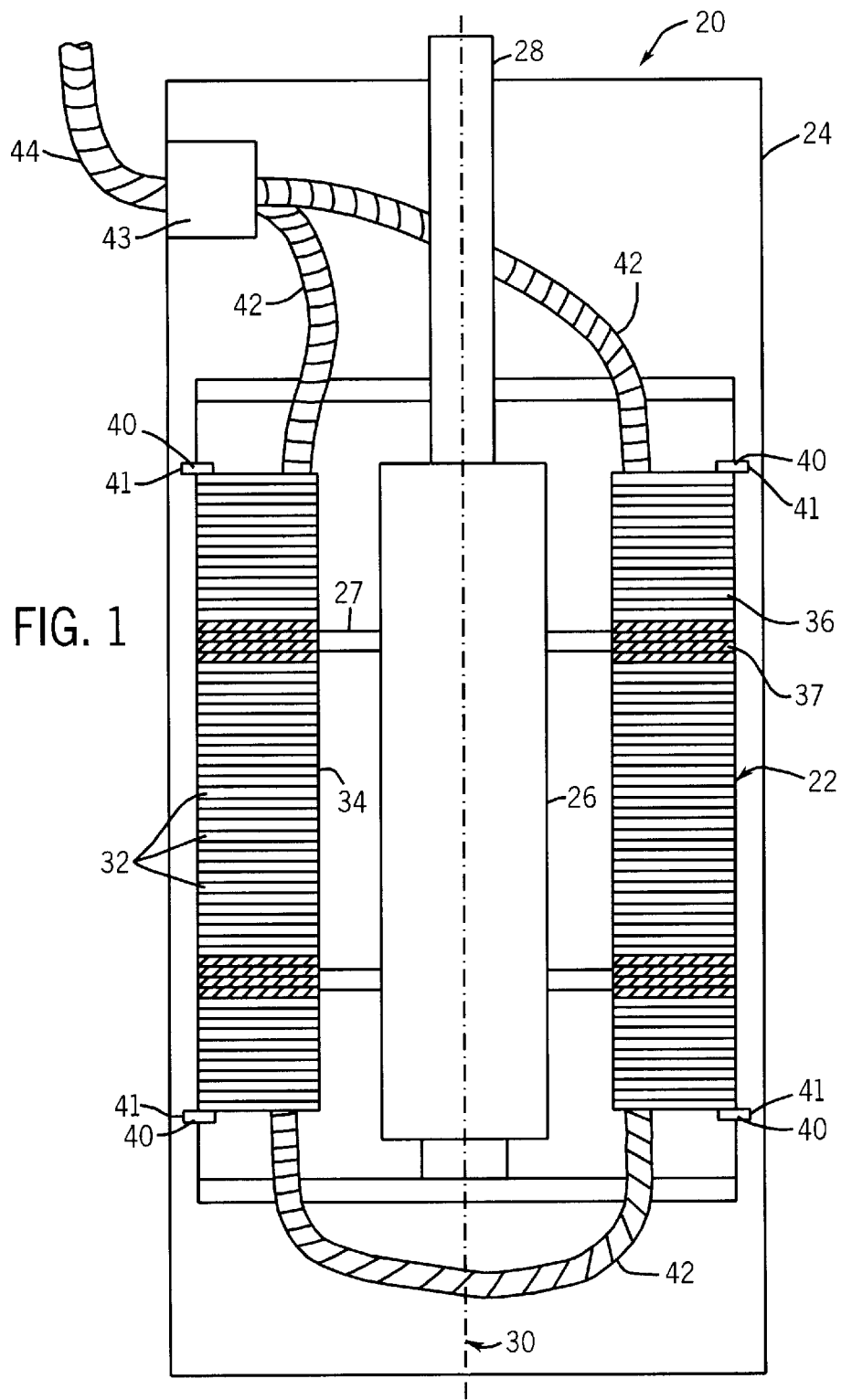
FIG. 1 is a cross-sectional view of an electric motor, according to a preferred embodiment of the present invention.

Referring generally to FIG. 1, an electric motor 20 is illustrated according to a preferred embodiment of the present invention. Motor 20 is an exemplary motor, such as an elongate, submersible motor that may be connected in a submersible pumping system of the type deployed in a wellbore to pump production fluids, e.g. petroleum. However, the present invention should not be limited to submersible motors. Electric motor 20 generally includes a stator 22 mounted in a stator housing 24. The stator 22 is used to produce a magnetic field. A rotor 26 is disposed within the stator 22 and supported by bearings 27. The rotor is mounted to a shaft 28 for rotation about an axis 30 within the stator housing 24. The rotor 26 rotates about the axis 30 under the influence of the magnetic field produced by the stator 22, as is understood by those of ordinary skill in the art.

Figure 2:
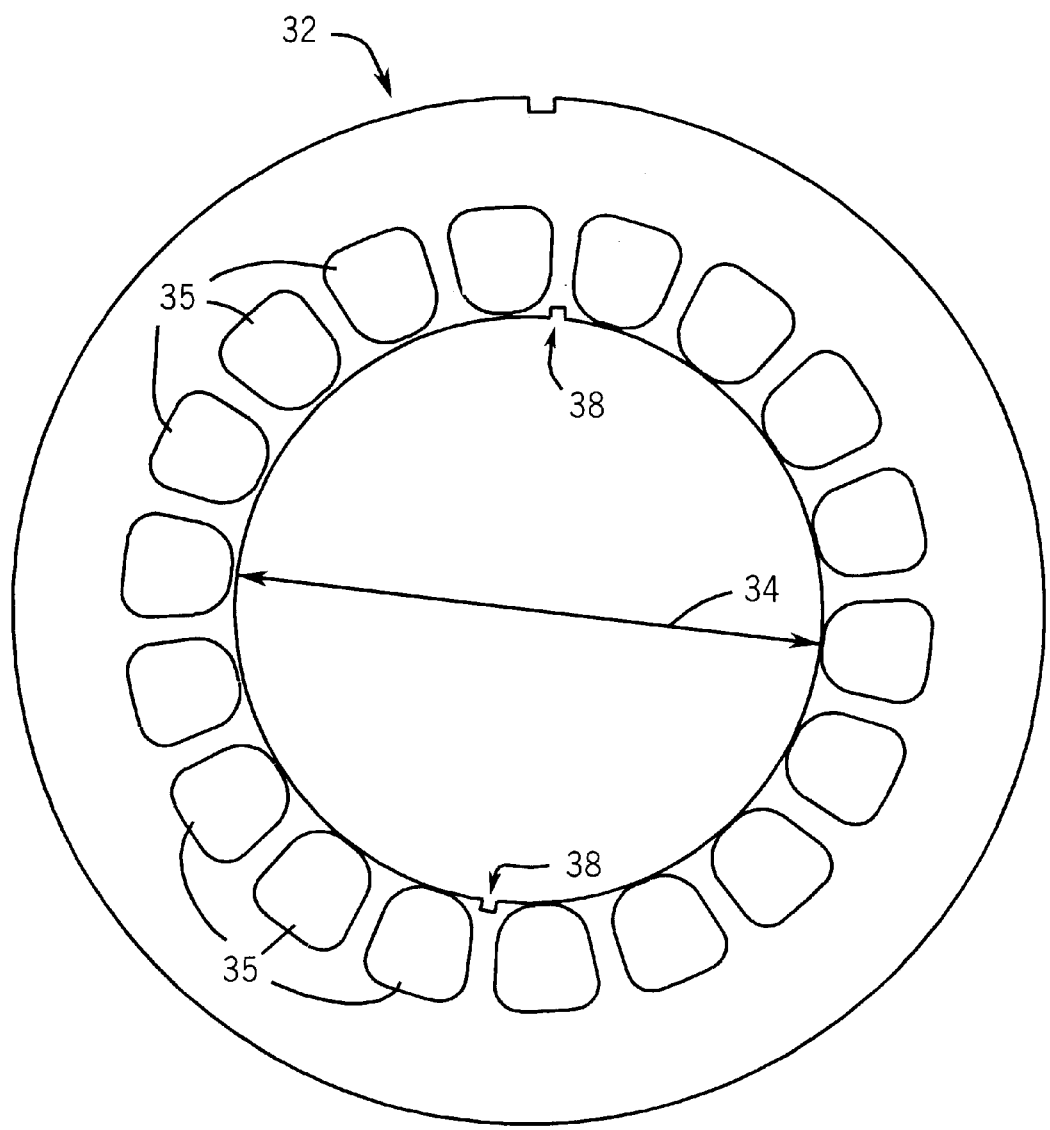
FIG. 2 is a top view of a metallic lamination.

Referring generally to FIGS. 1 and 2, the stator of a typical electric motor is made from a plurality of metallic laminations 32 that are stacked together. The laminations 32 have an interior opening 34 into which the rotor 26 and shaft 28 are received when the motor 20 is fully assembled. Additionally, each lamination 32 includes a plurality, e.g. 18, of axial openings 35 that are radially outlying from interior opening 34. As the laminations 32 are stacked together to form a stator 22, the axial openings 35 are aligned to create longitudinal slots through the stator 22. Eventually, conductors are disposed through these longitudinal slots. There are typically two different lamination materials used in electric motor construction. The largest number of laminations are made from steel 36, but bronze laminations 37 are also used as the bearing surfaces for the rotors. A typical electric motor may have 18 inches of steel laminations followed by 2.5 inches of bronze laminations. Finally, the laminations 32 also include at least one keyway 38 for alignment with a key during installation.

Figure 3:
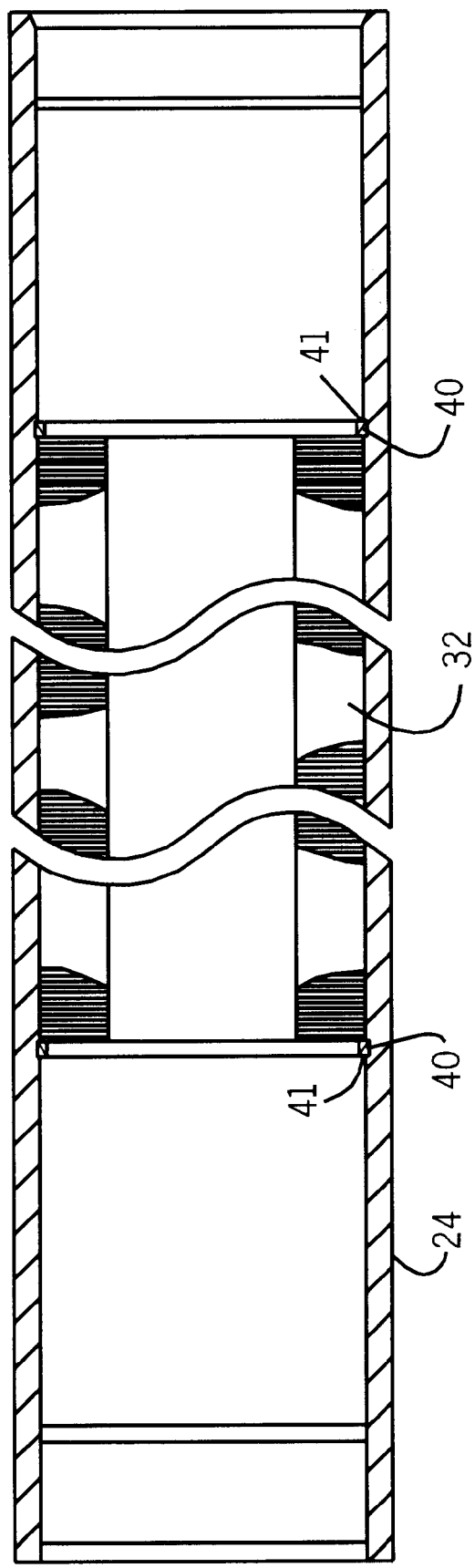
FIG. 3 is a cross-sectional view of stator laminations stacked and compressed within a stator housing between two snap rings.

Referring generally to FIGS. 1 and 3, during assembly the metallic laminations 32 are stacked together on a mandrel and then inserted into the stator housing 24. The laminations 32 are compressed together inside the stator housing 24 to solidify the stator construction and prevent the laminations 32 from moving or rotating within the stator housing 24. The laminations 32 are maintained in a state of compression by two snap rings 40. The snap rings are placed in grooves 41 around the interior of the stator housing 24.

After the laminations 32 are installed within the stator housing 24 conductive wiring 42 is wound through the axial openings 35. An electrical connector 43 is used to couple an electrical cable 44 from the surface to the conductive wiring 42 in the electric motor 20.

Figure 4:
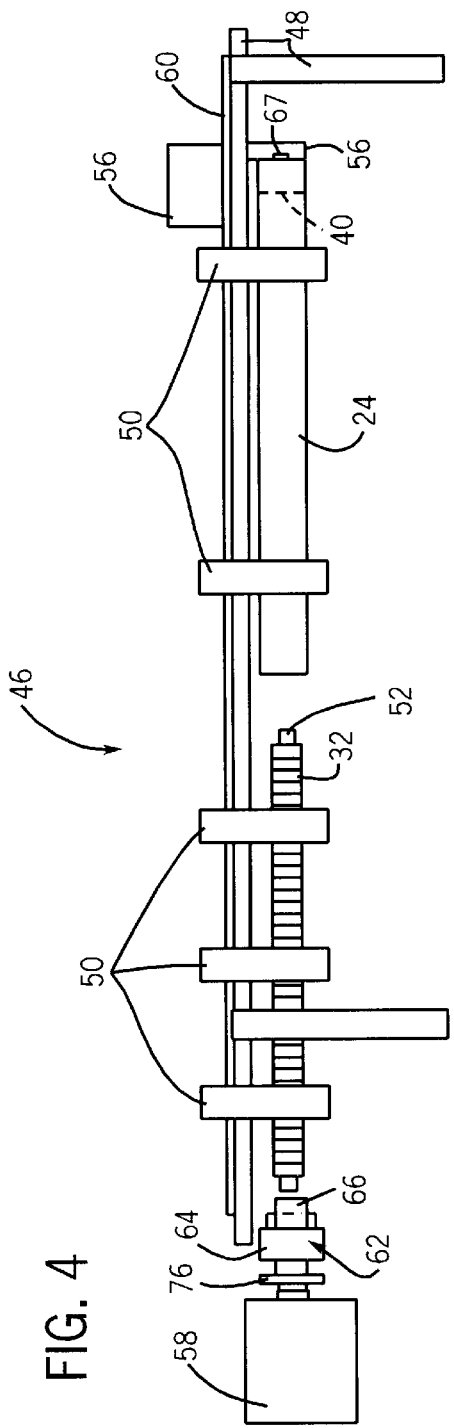
FIG. 4 is a front elevational view of an automated stator press, according to a preferred embodiment of the present invention.
Figure 5:
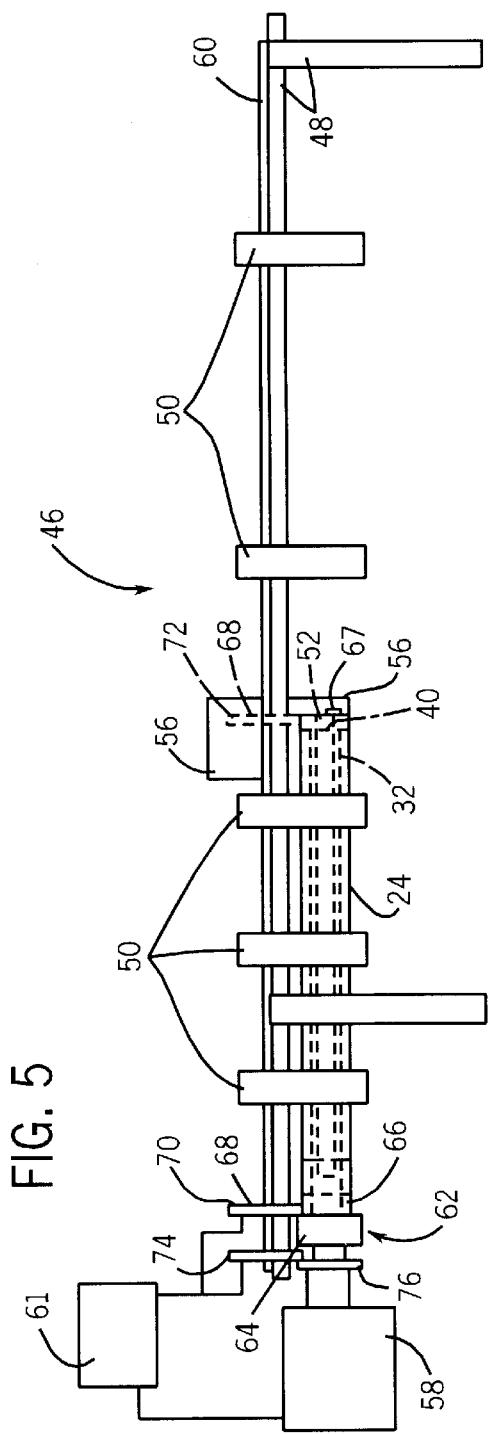
FIG. 5 is a front elevational view of an automated stator press, illustrating a stator housing disposed over a mandrel and laminations.

Referring generally to FIGS. 4 and 5, an automatic stator press 46 is used to insert the metallic laminations 32 into the stator housing 24 and to compress the laminations 32 together inside the stator housing 24. The automatic stator press 46 has a support frame 48 and a plurality of saddles 50 that support the metallic laminations 32 and the stator housing 24. The laminations 32 are stacked together over mandrel 52 and then placed in saddles 50 at the hydraulic ram end of the automatic stator press 46.

The stator housing 24 is placed in the automatic stator press 46 at the tail end opposite mandrel 52 and metallic laminations 32. In the illustrated embodiment, a tailstock 56, is used to drive the stator housing 24 over the mandrel 52 and metallic laminations 32. Tailstock 56 is a resistance head drive system that travels along rack 60 mounted atop the frame 48. The stator housing 24 is, in turn, attached to or abutted with the tailstock 56. As the tailstock 56 travels along the rack 60 it forces the stator housing 24 toward the laminations 32. Initially, a snap ring 40 is placed inside the stator housing 24 at the end opposite the mandrel 52. This snap ring 40 abuts the metallic laminations 32 when the stator housing 24 is in proper position over the mandrel 52.

Referring generally to FIG. 5, when the stator housing 24 is in position over the laminations 32 the tailstock 56 can be locked into place. A hydraulic ram 58 is used to compress the laminations 32 inside the stator housing 24. The hydraulic ram 58 is operated by an automatic control system 61. An air-operated insertion tool 62 is used with the hydraulic ram 58 to compress the laminations 32 and also to install a second snap ring 40 into a groove 41 inside the stator housing 24, thus maintaining the laminations 32 under compression. The air-operated insertion tool 62 includes an outer portion 64 that attaches to the stator housing 24 and an inner portion 66 that is driven by the hydraulic ram 58 through the outer portion 64 and into contact with the metallic laminations 32. A second snap ring 40 can also be inserted into the stator housing 24 by the air-operated insertion tool 62.

The locked tailstock 56 prevents the stator housing 24 and, thus, the laminations 32 from moving away from the force of the hydraulic ram 58. This results in the laminations 32 being compressed inside the stator housing 24 between the air-operated insertion tool 56 and the tailstock 56. The tailstock 56 may utilize an adapter sized to fit against the laminations 32 and to thereby assist the first snap ring 40 in compressing the laminations and to prevent the laminations from bowing. A pressure transducer 67 can be included in the tailstock to measure the force of compression provided by the hydraulic ram. An alternative method of operation is to secure the end of the stator housing 24 adjacent the insertion tool 62 to the frame 48, as opposed to the tailstock 56. In the former method, the force of the hydraulic ram 58 on the laminations 32 will tend to stretch the stator housing 24. In the latter method, the force of the hydraulic ram 58 on the laminations 32 will tend to stretch the frame 48.

To determine the amount of stretch of the stator housing, a digital scale 68 is used to measure the length of the stator housing 24 before, during, and after the laminations 32 are compressed. During operation, a stator housing that is initially 10' long may stretch to 10'1/8" during compression of the laminations. After compression, when the snap rings are installed, the stator housing may remain stretched to 10'1/16". The digital scale travels along a rail (not shown) along the top of the frame 48. In the illustrated embodiment the digital scale 68 is shown in two positions, at each end of the stator housing 24. The first position is the zero position 70. Here the scale 68 is zeroed. The scale 68 is then moved along the rail to a second position 72 at the other end of the stator housing 24, measuring the length of the housing 24 as it travels. The digital scale 68 is attached to the end of the housing 24 and moves with any change in the length of the housing 24 caused by the compression of the laminations 32. The digital scale 68 can also be used to provide a signal to the automatic control system 61.

A second digital scale 74 is used to measure the movement of the inner portion 66 of the insertion tool 62. This scale also can be used to provide a signal to the automatic control system 61. This scale provides an operator and the automatic control system 61 with an indication of the amount of compression in the laminations 32. It should be noted that automatic control system 61 may comprise a variety of commercially available controllers, such as a programmable logic controller or a computer numerical control.

Figure 6:
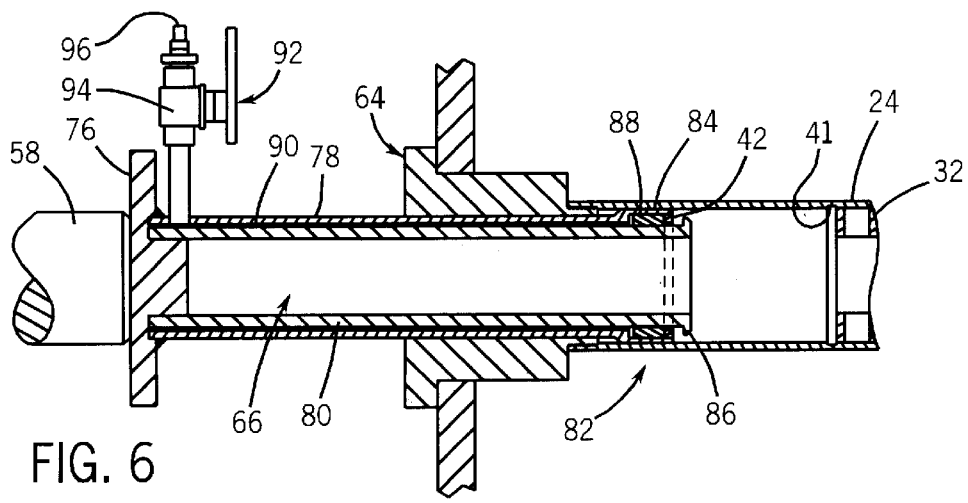
FIG. 6 is a cross-sectional view of a hydraulic ram, a stator housing, and an air-operated insertion tool, according to a preferred embodiment of the present invention.
Figure 7:
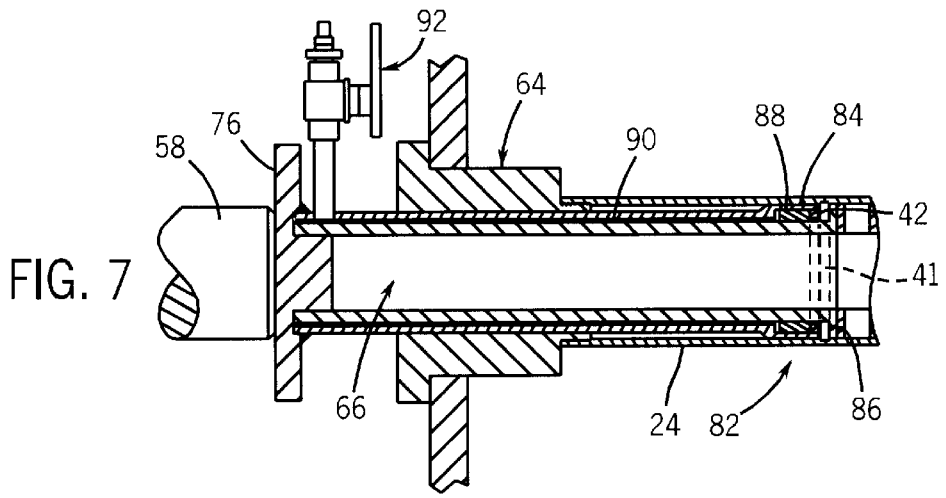
FIG. 7 is a cross-sectional view of the hydraulic ram, the stator housing, and the air-operated insertion tool, illustrating the hydraulic ram driving the inner portion of the air-operated insertion tool to compress the laminations within the stator housing.
Figure 8:
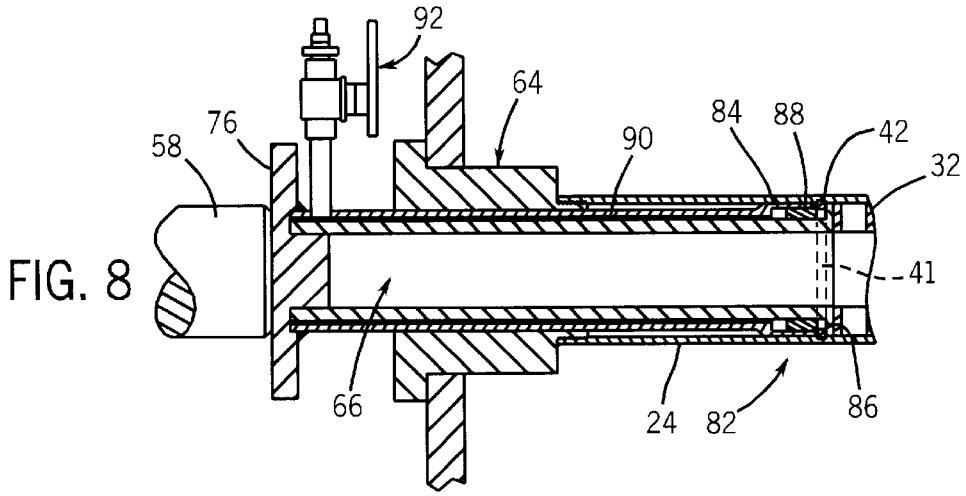
FIG. 8 is a cross-sectional view of the hydraulic ram, the stator housing, and the air-operated insertion tool, illustrating the insertion of a snap ring into the stator housing by a snap ring deployment tool on the air-operated insertion tool.

Referring generally to FIGS. 6, 7 and 8, the outer portion 64 of the air-operated insertion tool 62 threads into the end of the stator housing 24. The inner portion 66 of the air-operated insertion tool slides through the outer portion 64. The inner portion 66 includes an abutment plate 76 that is contacted by the hydraulic ram 58. The inner portion 66 also includes an outer sleeve 78 and an inner sleeve 80.

In the illustrated embodiment, at the end of the sleeves adjacent to the stator housing 24 is a snap ring deployment assembly 82. The snap ring deployment assembly 82 retains the second snap ring 42 near the end of the inner sleeve 80. The snap ring 42 is retained between an outer jacket 84 and a raised portion 86 of the inner sleeve 80 and against a sliding sleeve 88. There is a narrow passage 90 formed between the inner sleeve 78 and the outer sleeve 80 that leads to the sliding sleeve 88. A valve assembly 92 couples compressed air to the narrow passage 90 in the air-operated insertion tool. When air is applied, the compressed air forces the sliding sleeve 88 forward, pushing the snap ring 40 away from the outer jacket 84 and the inner sleeve 78, towards the groove 41 in the stator housing 24. The snap ring 40 expands into the groove 41, forming a barrier to the laminations 32. Thus, the laminations remain compressed even after the force of the hydraulic ram is removed.

Referring generally to FIG. 7, the hydraulic ram 58 can be automatically operated by the automatic control system 61 to drive the abutment plate 76 toward the stator housing 24. This forces the inner portion 66 of the insertion tool 62 against the metallic laminations 32, compressing the laminations 32.

The automatic control system 61 includes an interface, such as a graphical user interface, and electronic memory to enable an operator to provide the control system with desired process information, such as the amount of desired compression. The control system also receives process information from sensors, such as the pressure transducers and digital scales. The automatic control system 61 also includes a processor to compare the process information stored in the electronic memory to the process information provided by the sensors. This enables the automated stator press 46 to automatically produce the desired amount of compression in the laminations without distorting the shape of the stator housing.

Referring generally to FIG. 8, once the desired amount of compression has been achieved by the automated stator press, an operator can perform a series of checks to ensure second snap ring 42 is in proper position for insertion into the groove 41. The operator can compare the amount of stretch indicated by the first digital scale 68 with the position shown by the second digital scale 74 to ensure that the second snap ring 42 is positioned properly for insertion into the groove 41 inside the stator housing 24. If satisfied, the operator opens valve assembly 92 and compressed air from the valve assembly 92 passes through the narrow passage 90 toward the sliding sleeve 88. The second snap ring 42 is then driven forward into the corresponding groove 41, where it expands for retention in groove 41. If not satisfied, the operator can manually position the ram to the desired location.

Once the second snap ring 42 has been installed, the hydraulic ram 58 is withdrawn and the second snap ring 42 maintains the laminations 32 under compression. The stator housing 24 is then removed from the automatic stator press 46, and the remainder of the manufacturing process is completed, e.g. winding conductors through the axial openings 35 in the laminations 32.

Elements of the air-operated insertion tool 62 include an isolation valve 94 and a hose connection 96 (see FIG. 6) to provide and control the supply of air. Additionally, a hoist ring also can be used in combination with a hoist or crane to position the insertion tool. Furthermore, various O-rings may be used to create seals between the sleeves, and the insertion tool may include handles to assist in threading the outer sleeve 78 into the stator housing 24.

Figure 9:
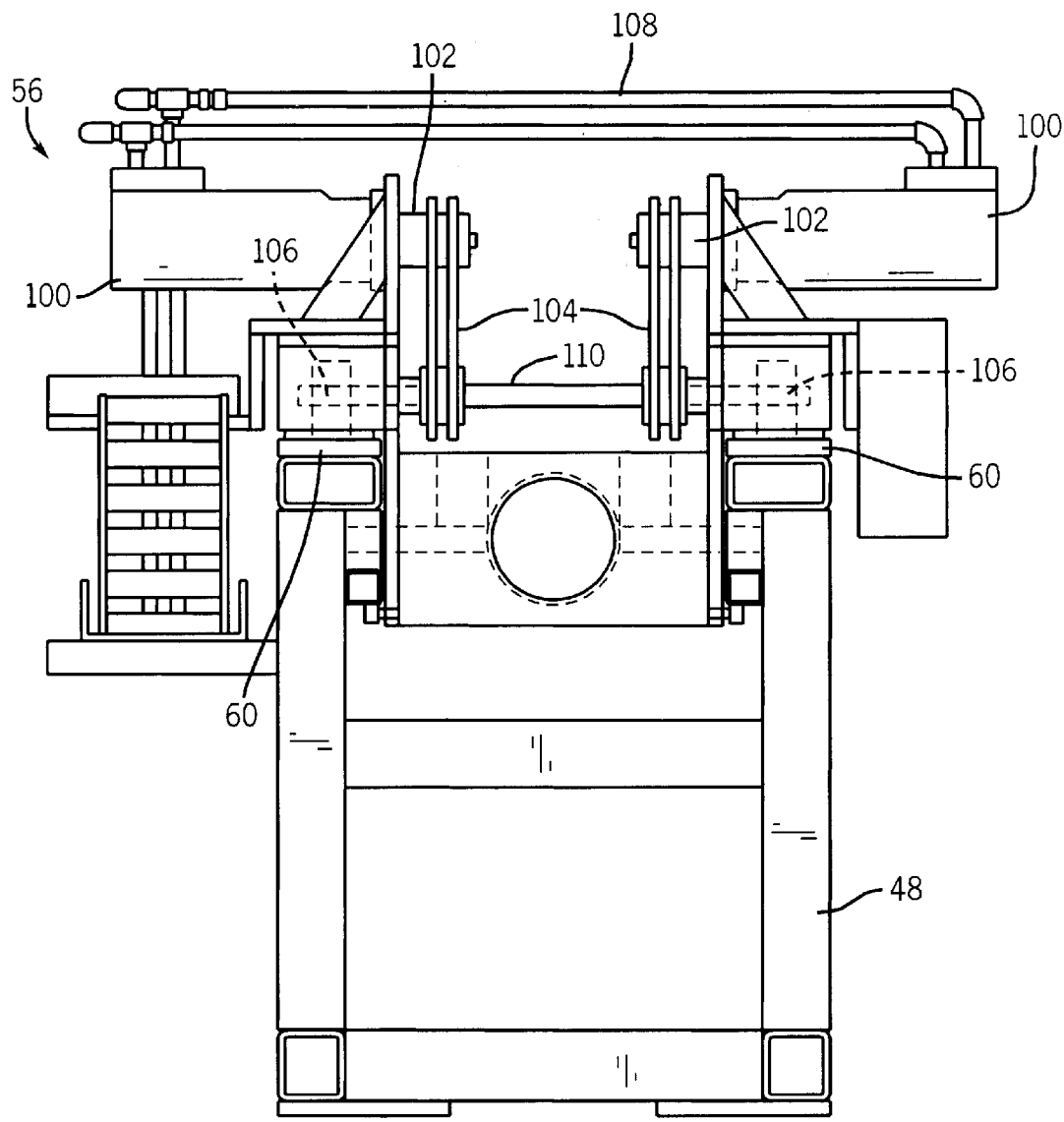
FIG. 9 is an end view of a drive system and frame of the automated stator press, according to a preferred embodiment of the present invention.

Referring generally to FIG. 9, the frame 48 and tailstock 56 of an exemplary embodiment of the automated stator press is shown. Rack 60 resides along the top of and on each side of frame 48. The tailstock 56 travels along rack 60 via two hydraulic motors 100. The drive shafts 102 of the hydraulic motors 100 are drivingly coupled by chain drives 104 to two gears 106. Hydraulic fluid lines 104 couple hydraulic fluid to power the hydraulic motors 100. As the gears 106 rotate, tailstock 56 is driven along rack 60. The gears 106 are governed together by a coupler 110 to maintain a uniform speed. It should be noted that a variety of different drive systems can used with the automated stator press. For example, electric motors can be used in place of the hydraulic motors and/or a screw drive system can be used rather than a rack-and-pinion system.

Figure 10:
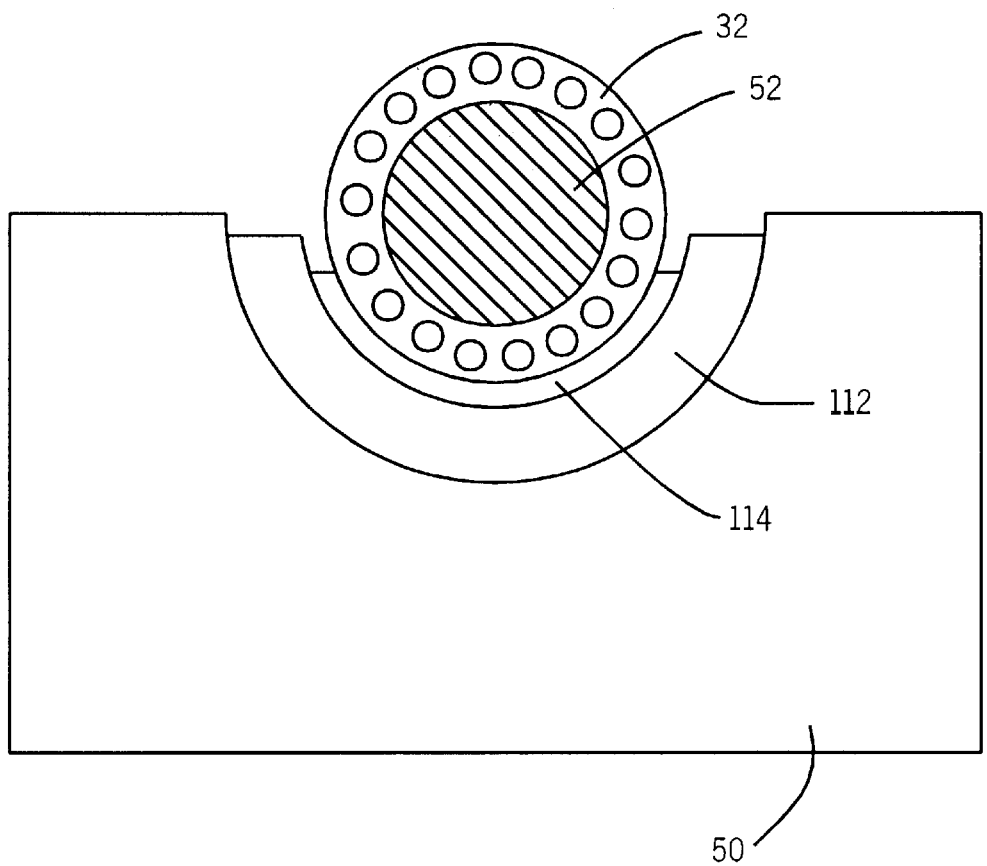
FIG. 10 is an end view of the laminations disposed over a mandrel supported in a saddle by a shoe and a shim respectively, according to a preferred embodiment of the present invention.
Figure 11:
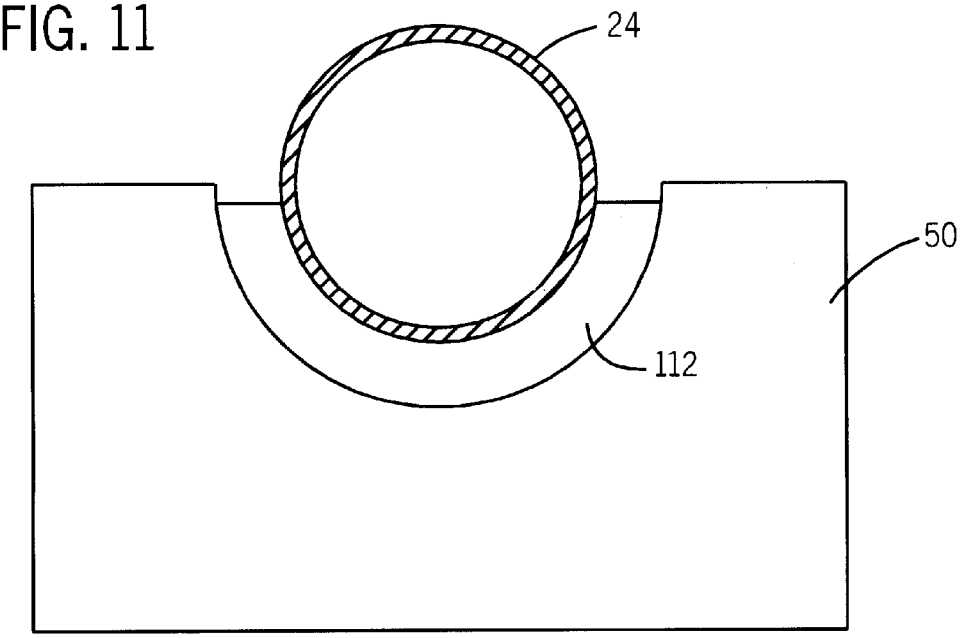
FIG. 11 is an end view of the stator housing supported in a saddle by a shoe, according to a preferred embodiment of the present invention.
Figure 12:
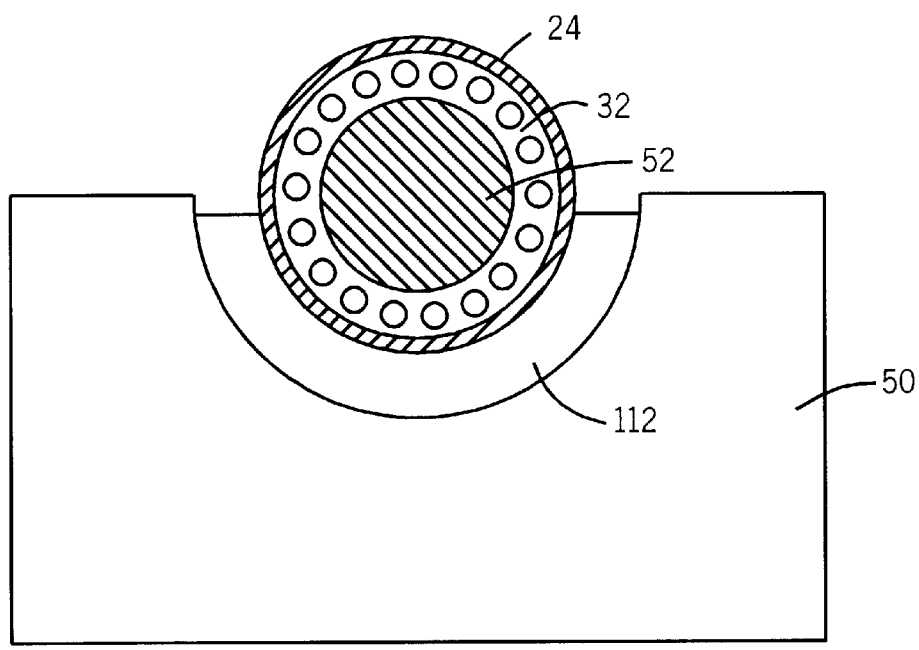
FIG. 12 is an end view similar to that of FIGS. 11 and 12, but illustrating the stator housing displacing the shims as the stator housing is moved over the shoe.

Referring generally to FIGS. 10, 11, and 12, the stator housing 24 and laminations 32 placed over mandrel 52 are supported in frame 48 by saddles 50. FIG. 10 illustrates laminations 32 and mandrel 52 placed in a saddle 50. A shoe 112 is placed in each saddle 50. Shims 114 that sit atop shoes 112 support the laminations and mandrel. Shims 114 help to center the mandrel 52 and laminations 32 inside stator housing 24 during installation. As illustrated in FIG. 11, shoes 112 also support stator housing 24 in each saddle 50.

Referring generally to FIG. 12, stator housing 24 displaces shim 114 as the stator housing is driven over the laminations. The stator housing 24 is supported by the shoe 112 after the shim 114 is displaced. This process continues through each of the three saddles 50 as the stator housing 24 is fully moved over mandrel 52 and laminations 32. A small quantity of lubricating oil is coated over the laminations to ease the insertion of the laminations into the stator housing. The lubricating oil may also be used to facilitate movement of the stator housing 24 over shoes 112. Shoes 112 and shims 114 may be formed in a variety of sizes, depending on the size of the stator housing 24 and the laminations 32.

Figure 13:
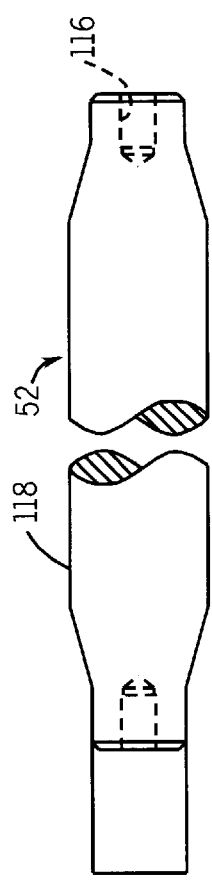
FIG. 13 is a side elevational view of a mandrel, according to a preferred embodiment of the present invention.

After insertion of laminations 32, the automatic stator press 46 removes mandrel 52 from stator housing 24. To facilitate removal, each end of mandrel 52 has a threaded recess 116 to allow a mandrel removal tool (not shown) to be threaded into the mandrel 52, as illustrated in FIG. 13. The mandrel removal tool is then connected to the tailstock 56. The tailstock 56 pulls the mandrel 52 from inside the stator housing 24. A mandrel shoe, similar to the shoe 112 used to support the stator housing 24, is placed in each saddle 50 to support the mandrel 52 as it is withdrawn from the stator housing 24. In the illustrated embodiment, the mandrel 52 has a key 118 for alignment with the keyway 38 formed in metallic laminations 32.

Figure 14:
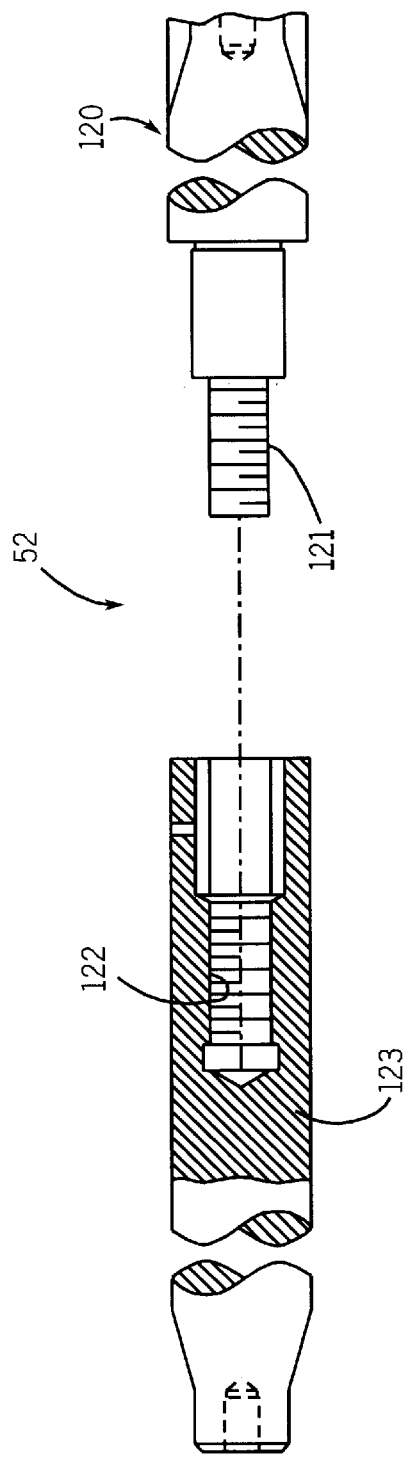
FIG. 14 is a elevational view of a two-piece mandrel, according to an alternative embodiment of the present invention.

Referring generally to FIG. 14, a mandrel may alternatively be constructed in two-pieces. In the illustrated embodiment, a first mandrel piece 120 with a threaded male end 121 is threadably inserted into a female receptacle 122 in a second mandrel piece 123.

It will be understood that the foregoing description is of a preferred embodiment of this invention, and that the invention is not limited to the specific form shown. For example, the motors used in the drive system may be electric motors rather than hydraulic motors; the size of the components can be adjusted according to the application; and the control system can be adapted to a variety of sensors and configurations. Furthermore, the automated stator press may be used to compress laminations in a stator for a generator, rather than an electric motor. These and other modifications may be made in the design and arrangement of the elements without departing from the scope of the invention as expressed in the appended claims.

What is claimed is:

1. A method of manufacturing a stator, comprising:
   locating a plurality of stator laminations over a mandrel;
   inserting the plurality of stator laminations and the mandrel into a stator housing;
   compressing the plurality of stator laminations with a ram that extends into stator housing;
   automatically controlling the compression of the plurality of stator laminations with a control system; and
   placing a stop into the stator housing to maintain the stator laminations in a state of compression after the ram is removed.

2. The method as recited in claim 1, further comprising sensing various parameters related to insertion of the plurality of stator laminations.

3. The method as recited in claim 2, wherein sensing includes determining the length of the stator housing.

4. The method as recited in claim 2, wherein sensing includes measuring the force of lamination compression.

5. The method as recited in claim 1, further comprising using a digital scale to continuously measure the length of the stator housing.

6. The method as recited in claim 1, comprising utilizing a digital scale to continuously measure the amount of compression of the plurality of laminations.

7. The method as recited in claim 1, comprising incorporating an insertion tool into the hydraulic ram to compress the plurality of laminations.

8. The method as recited in claim 1, wherein placing includes deploying a snap ring into a groove extending radially around an interior diameter of the stator housing.

* * * * *